A. G. McGREGOR.
VEHICLE TOP.
APPLICATION FILED MAY 18, 1920.
1,415,377.
Patented May 9, 1922.
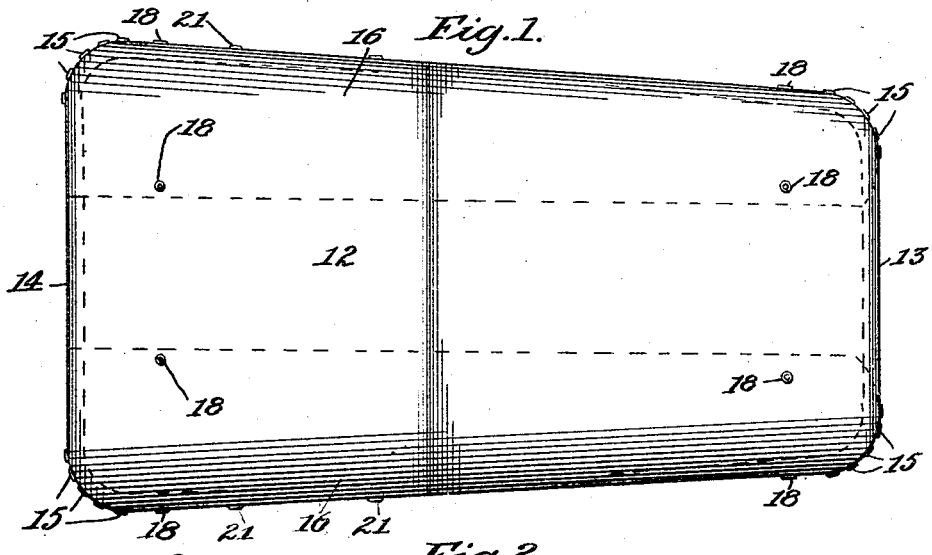
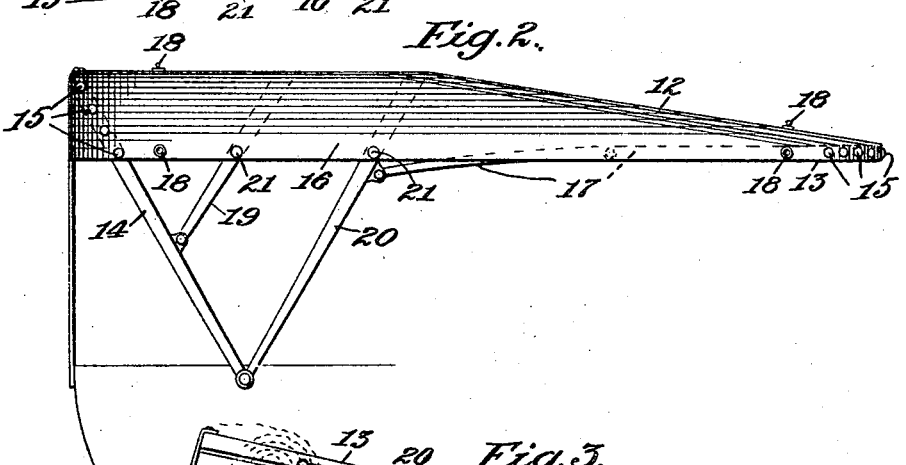
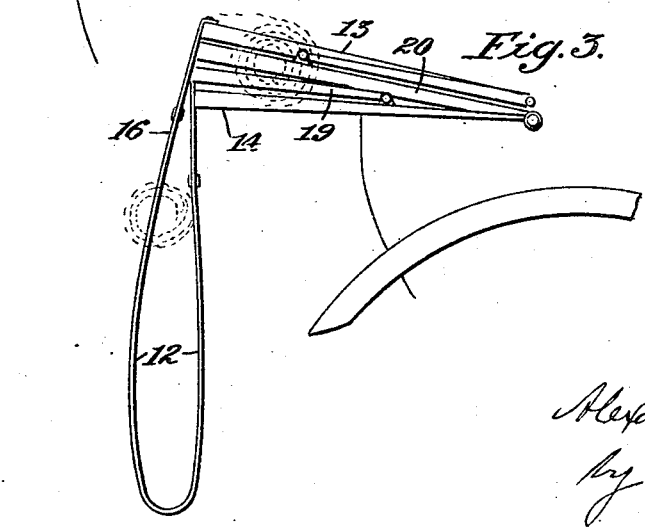
Inventor:
Alexander G. McGregor,
by Calvin Calvin,
Att'ys.

UNITED STATES PATENT OFFICE.

ALEXANDER GRANT McGREGOR, OF WARREN, ARIZONA.

VEHICLE TOP.

1,415,377.     Specification of Letters Patent.     Patented May 9, 1922.

Application filed May 18, 1920. Serial No. 382,418.

*To all whom it may concern:*

Be it known that I, ALEXANDER G. MCGREGOR, a citizen of the United States, residing at Warren, in the county of Cochise and State of Arizona, have invented or discovered certain new and useful Improvements in Vehicle Tops, of which the following is a specification, reference being had therein to the accompanying drawing.

This invention relates to canopy tops for automobiles and similar vehicles and has for its object to provide a construction whereby the flexible covering material for a vehicle top will be uninjured when the vehicle top is folded down. In folding down vehicle tops as at present constructed the flexible covering material is partly folded in between the bows and is liable to be more or less sharply creased in places and this has a tendency to crack or injure the said covering material. Also in tucking the covering material between the bows there is more or less liability of pinching the fingers of the person or persons who are folding down the vehicle tops, and these objections are entirely avoided by the present invention, as it will hereinafter more fully appear.

In the accompanying drawing Fig. 1 is a somewhat diagrammatic top view of a vehicle top embodying the present invention and Fig. 2 is a side view thereof, the top being in raised or operative position in both views. Fig. 3 is a somewhat diagrammatic side view showing the top in closed or lowered position and illustrating the manner in which the flexible material of the vehicle top will be handled in getting the same into compact form.

Referring to the drawing, 12 denotes the flexible material constituting the covering for the vehicle top, this covering material being preferably permanently attached to the front bow 13 and the rear bow 14, except at its corner portions. The corner portions of the flexible covering 12 are detachably secured to the said front and back bows, preferably by snap fasteners, as indicated at 15, so that the depending side parts 16 of the top cover may be readily detached from the said bows and folded over on to the cover 12, as indicated in dotted lines in Fig. 1, when the vehicle top is to be folded down. In order to detach the corner portions of the cover 12 from the bows it will be necessary first to slacken or partly fold back the vehicle top which, in the construction herein shown, may be effected by loosening the toggles 17 by which the front bow is forced forward in stretching the top covering into operative position. When the parts 16 are folded over on to the cover 12 they may be temporarily secured in such positions by snap fasteners, as 18.

The side portions 16 of the cover are detachably secured to the intermediate bows 19 and 20 by snap fasteners or buttons, at 21, so that these side portions may be detached from the said bows 19 and 20, (over which the cover 12 is stretched, unattached) when the corner portions of the cover are detached from the front and back bows.

In folding down the vehicle top the side portions 16 of the covering material will be detached from the front and back bows at the corners of the cover 12, and will then be folded over on to the said cover 12, as denoted by dotted lines in Fig. 1. When the vehicle top is folded back, as indicated in Fig. 3, the cover 12, with the infolded parts 16, will drop as shown in full lines in Fig. 3, and may then be loosely rolled up, as denoted by dotted lines, and may be finally deposited in a roll between the bows, resting on the back curtain of the vehicle.

From the foregoing it will be understood that the invention provides a construction whereby the flexible covering material for a vehicle top may be conveniently rolled into compact form, when the vehicle top is folded down, without being tightly creased, so that injury to the covering material, which might result in more or less tightly creasing the same, will be avoided. Moreover, with this improved construction the vehicle top may be conveniently folded down with very little labor, as will be understood. Any equivalents for the snap fasteners hereinbefore referred to may be employed for detachably securing the corner portions of the cover 12 to the front and back bows.

Having thus described my invention I claim and desire to secure by Letters Patent:

A vehicle top comprising front and back bows and intermediate bows, in combination with a flexible cover permanently attached to said front and back bows between its corner portions, but detachably secured to said bows at its corner portions, said cover comprising a body portion to extend over the tops of the bows, and depending parts at the sides of said body portion; whereby, when the top is to be folded down, the depending side parts of said cover, when detached from the bows, may first be folded over on to the body of the cover and fastened down, and the cover then be folded back and rolled up without danger of wrinkling or injuring the same, as set forth.

In testimony whereof I affix my signature.

ALEXANDER GRANT McGREGOR.